United States Patent
Alapuranen et al.

(10) Patent No.: US 12,519,688 B2
(45) Date of Patent: Jan. 6, 2026

(54) SYSTEM AND METHOD FOR OPTIMIZING PROCESSING OF PROTOCOL SIGNALING MESSAGES FOR IDENTIFICATION OF ERRORS

(71) Applicant: Florida R&D Associates, LLC, Debary, FL (US)

(72) Inventors: Pertti O. Alapuranen, Deltona, FL (US); Robert S. Prine, Winter Springs, FL (US)

(73) Assignee: FLORIDA R&D ASSOCIATES, LLC, Debary, FL (US)

( * ) Notice: Subject to any disclaimer, the term of this patent is extended or adjusted under 35 U.S.C. 154(b) by 11 days.

(21) Appl. No.: 18/443,843

(22) Filed: Feb. 16, 2024

(65) Prior Publication Data

US 2024/0388498 A1   Nov. 21, 2024

Related U.S. Application Data

(60) Provisional application No. 63/466,576, filed on May 15, 2023.

(51) Int. Cl.
*G06F 15/16* (2006.01)
*H04L 41/0686* (2022.01)
*H04L 41/16* (2022.01)
*H04L 41/22* (2022.01)

(52) U.S. Cl.
CPC .......... *H04L 41/0686* (2013.01); *H04L 41/16* (2013.01); *H04L 41/22* (2013.01)

(58) Field of Classification Search
CPC ....................................................... H04L 41/16
See application file for complete search history.

(56) References Cited

U.S. PATENT DOCUMENTS

| | | | |
|---|---|---|---|
| 6,807,173 B1 | 10/2004 | Lee et al. | |
| 7,630,319 B1 * | 12/2009 | Studtmann | H04L 65/1104 709/227 |
| 2008/0069112 A1 | 3/2008 | Suri et al. | |
| 2008/0205330 A1 | 8/2008 | Stadler et al. | |
| 2018/0213518 A1 | 7/2018 | Jang et al. | |

OTHER PUBLICATIONS

International Search Report and the Written Opinion of the International Searching Authority, mailed May 23, 2024 in PCT Application No. PCT/US 24/16172, International Filing Date: Feb. 16, 2024 (Feb. 16, 2024).

* cited by examiner

*Primary Examiner* — Padma Mundur
(74) *Attorney, Agent, or Firm* — Sagacity Legal PLLC

(57) ABSTRACT

A system including a server for optimizing processing of a protocol signaling message exchanged between at least two communication devices for identification of errors. The server is configured to receive the protocol signaling message and decode to obtain a decoded protocol signaling message. The server is further configured to assign a plurality of unique tokens correspondingly to sets of bytes of a plurality of bytes in the decoded protocol signaling message and determine an order of the plurality of unique tokens. The server is configured to track errors in the protocol signaling message based on a comparison of the order of the plurality of unique tokens with a reference order of a plurality of reference protocol signaling messages received by the server prior to receiving the protocol signaling message and display the errors in the protocol signaling message on a user interface.

20 Claims, 14 Drawing Sheets

*136*

| TOKEN | SET OF BYTES | FREQUENCY | METADATA |
|---|---|---|---|
| 1 | 2B 00 | 30 | ... |
| 2 | 4A 56 | 19 | ... |
| 3 | B3 3C | 16 | ... |
| 4 | EC A1 | 15 | ... |
| 5 | 00 C0 | 10 | ... |

*FIG. 3*

| MESSAGE TOKEN | PROTOCOL SIGNALING MESSAGE | FREQUENCY | METADATA |
|---|---|---|---|
| A | 2B00 4A56 BE3C ECA1 00C0 | 30 | ... |
| B | 6F2C 003C 5F2C 4A60 24B2 | 25 | ... |
| C | 9A2B 2BC0 F37D 3CE4 00E0 | 20 | ... |

*FIG. 9*

SYSTEM AND METHOD FOR OPTIMIZING PROCESSING OF PROTOCOL SIGNALING MESSAGES FOR IDENTIFICATION OF ERRORS

CROSS-REFERENCE TO RELATED APPLICATIONS

The present application claims the benefit of U.S. Provisional Application No. 63/446,576, filed Feb. 17, 2023, entitled "Analysis of network performance based on sequence analysis using Artificial Neural Networks" which is incorporated by reference herein in its entirety.

BACKGROUND OF THE INVENTION

Protocol signaling messages act as control signals, establishing, and managing connections between devices (for example, a base station and a mobile device) in a network. Within the network, numerous signaling messages are exchanged per minute. When there is a failure or an error in message delivery, the devices frequently reattempt connection between the devices, further increasing message traffic and message processing delays, and in some cases leading to connection failure.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

FIG. 3 illustrates an exemplary token map identifying mapping between tokens and sets of bytes of the decoded reference protocol signaling message of FIG. 2, in accordance with some embodiments.

FIG. 9 illustrates an exemplary message token map identifying mapping between message tokens and decoded reference protocol signaling messages of the group of decoded reference protocol signaling messages of FIG. 8, in accordance with some embodiments.

Figure 1A:
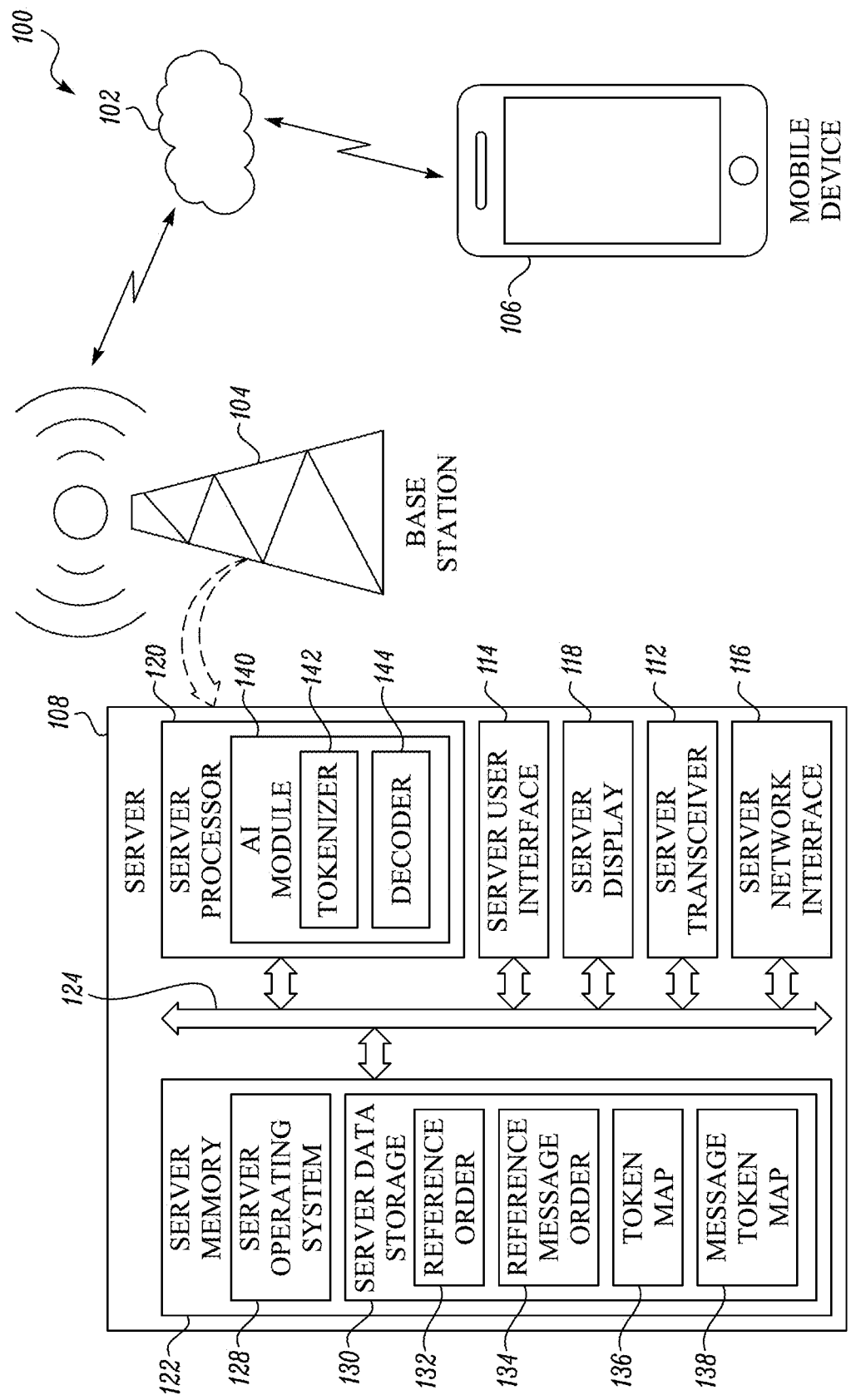
FIGS. 1A and 1B illustrate various example systems for optimizing processing of an exemplary group of protocol signaling messages, in accordance with some embodiments.

Skilled artisans will appreciate that the elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In one aspect, a system includes a communication network, at least two communication devices configured to exchange a protocol signaling message over the communication network, and a server communicatively coupled to at least one communication device of the two communication devices over the communication network to optimize processing of the protocol signaling message for identification of errors in the protocol signaling message. The server is configured to receive, by a server transceiver, the protocol signaling message and decode, by a server processor, the protocol signaling message to obtain a decoded protocol signaling message, the decoded protocol signaling message having a plurality of bytes. The server is further configured to assign, by the server processor, a plurality of unique tokens correspondingly to sets of bytes of the plurality of bytes and determine, by the server processor, an order of the unique tokens in the decoded protocol signaling message. Further, the server is configured to track, by the server processor using one or more artificial intelligence models, one or more errors in the protocol signaling message based on a comparison of the order of the unique tokens with a reference order of a plurality of reference protocol signaling messages received by the server prior to receiving the protocol signaling message and display, by the server processor, the errors in the protocol signaling message on a user interface.

In another aspect, a system includes a communication network, at least two communication devices configured to exchange a group of protocol signaling message including a protocol signaling message and one or more additional protocol signaling messages over the communication network, and a server communicatively coupled to at least one communication device of the two communication devices over the communication network to optimize processing of the protocol signaling message and the one or more additional protocol signaling messages for identification of message errors. The additional protocol signaling messages are exchanged in sequence to the protocol signaling message. The server is configured to receive, by a server transceiver, the protocol signaling message and the additional protocol signaling messages and assign, by a server processor, a plurality of unique message tokens correspondingly to the protocol signaling message and the additional protocol signaling messages. The server is further configured to determine, by the server processor, a message order of the unique message tokens and track, by the server processor using one or more artificial intelligence models, one or more message errors in the protocol signaling message and the additional protocol signaling messages based on a comparison of the message order of the unique message tokens with a reference message order of a plurality of groups of reference protocol signaling messages received by the server prior to receiving the protocol signaling message and the additional protocol signaling messages. Further, the server is configured to display, by the server processor, the message errors on a user interface.

In yet another aspect, a method for optimizing processing of a protocol signaling message for identification of errors in the protocol signaling message is described. The method includes receiving, by a server, the protocol signaling message exchanged between at least two communication devices over a communication network and decoding, by the server, the protocol signaling message to obtain a decoded protocol signaling message, the decoded protocol signaling message having a plurality of bytes. The method further includes assigning, by the server, a plurality of unique tokens correspondingly to sets of bytes of the plurality of bytes and determining, by the server, an order of the unique tokens in the decoded protocol signaling message. Further, the method includes tracking, by the server using one or more artificial intelligence models, one or more errors in the protocol signaling message based on a comparison of the order of the unique tokens with a reference order of a plurality of reference protocol signaling messages received by the server prior to receiving the protocol signaling message and displaying, by the server, the errors in the protocol signaling message on a user interface.

In yet another aspect, a method for optimizing processing of a group of protocol signaling messages for identification of message errors in the group of protocol signaling messages is described. The method includes receiving, by a server, the group of protocol signaling messages including a protocol signaling message and one or more additional protocol signaling messages exchanged between at least two communication devices over a communication network. The additional protocol signaling messages are exchanged in sequence to the protocol signaling message. The method further includes assigning, by a server, a plurality of unique message tokens correspondingly to the protocol signaling message and the additional protocol signaling messages and determining, by a server, a message order of the unique message tokens. Further, the method includes tracking, by the server using one or more artificial intelligence models, one or more message errors in the protocol signaling message and the additional protocol signaling messages based on a comparison of the message order of the unique message tokens with a reference message order of a plurality of groups of reference protocol signaling messages received by the server prior to receiving the protocol signaling message and the additional protocol signaling messages and displaying, by the server, the message errors on a user interface.

Figure 1B:
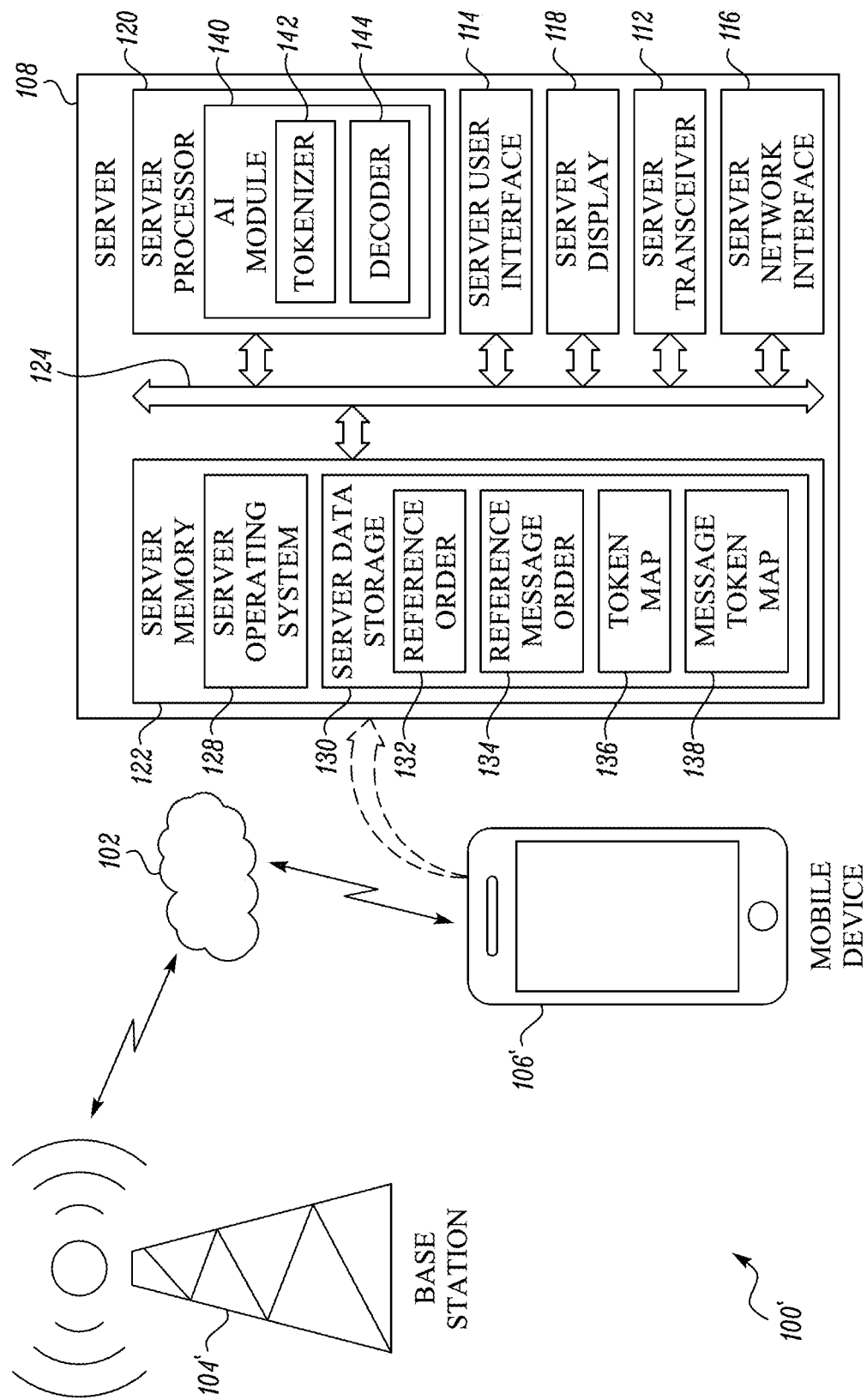

FIGS. 1A and 1B illustrate block diagrams of systems 100, 100' for continuously optimizing processing of a group of protocol signaling messages for identification of errors in the group of protocol signaling messages. The protocol signaling message (also known as protocol messages, control signals, or signaling messages) corresponds to any control message exchanged between two or more communication devices to control, establish, and/or manage connections, between the communication devices. The protocol signaling messages can include different messaging protocols depending upon a network they are applied in. For example, the protocol signaling message in a fifth $(5)^{th}$ generation mobile network can include one or more of RRC (Radio Resource Control) Configuration, RRC Connection Establishment, RRC Connection Reconfiguration, and/or other messaging protocols now known or in the future developed. As another example, the protocol signaling message in an Internet of Things (IoT) network can include one or more of MQTT (Message Queuing Telemetry Transport) CONNECT/DISCONNECT, DTLS (Datagram Transport Layer Security) Handshake, and/or other messaging protocols now known or in the future developed.

Referring to FIGS. 1A and 1B, the systems 100, 100' include a communication network 102, a first communication device 104, 104', a second communication device 106, 106', and a server 108. Although not shown, a person skilled in the art may appreciate that the systems 100, 100' can include more than two communication devices interchanging the group of protocol signaling messages with one another. In some embodiments, communication between the first communication device 104, 104', the second communication device 106, 106', and the server 108 occurs through the communication network 102. In some embodiments, the communication network 102 includes one or more of a wide area network (WAN) (for example, a transport control protocol/internet protocol (TCP/IP) based network), a cellular network, and/or a local area network (LAN), and similar such networks employing any of a variety of communications protocols as is well known in the art or developed in the future.

In accordance with various embodiments, the first communication device 104, 104' and the second communication device 106, 106' are configured to exchange the group of protocol signaling messages, including one or more protocol signaling messages, over the communication network 102. For example, the first communication device 104, 104' is a base station and the second communication device 106, 106' is a mobile device. In some embodiments, at least one of the first communication device 104, 104' and the second communication device 106, 106' are configured to store the group of protocol signaling messages exchanged between the first communication device 104, 104' and the second communication device 106, 106', although the group of protocol signaling messages can be stored separate to the first communication device 104, 104' and the second communication device 106, 106'. Further, one of the first communication device 104, 104' and the second communication device 106, 106' can include a user interface for one or more users, such as, an operator, to display the errors and to also receive user inputs/confirmations. Optionally, the user interface (for example, a server user interface 114) can be provided separate or remotely to the communication devices 104, 104', 106, 106'. Although FIG. 1A and FIG. 1B show the first communication device 104, 104' as the base station and the second communication device 106, 106' as the mobile device, it would be appreciated that the first communication device 104, 104' and the second communication device 106, 106' can be any communication device, now known or in the future developed, which are configured to transmit and/or receive the group of protocol signaling messages.

In accordance with various embodiments, the server 108 is configured to optimize processing of the group of protocol signaling messages for identification of one or more errors in the group of protocol signaling messages. As shown in FIG. 1A, the server 108 can be included, at least in part or in whole, in the first communication device 104, 104' to receive the group of protocol signaling messages exchanged between the first communication device 104, 104' and the second communication device 106, 106'. In some embodiments (not shown), the server 108 can be an entity separate from the first communication device 104, 104' and communicatively coupled to the first communication device 104, 104'. In such cases, the first communication device 104, 104' can be configured to store the group of protocol signaling messages received and/or transmitted by the first communication device 104, 104' and provide the group of protocol signaling messages to the server 108.

As shown in FIG. 1B, the server 108 can be alternatively included, at least in part or in whole, in the second communication device 106, 106' to receive the group of protocol signaling messages exchanged between the first communication device 104, 104' and the second communication device 106, 106'. In some embodiments (not shown), the server 108 can be an entity separate from the second communication device 106, 106' and communicatively coupled to the second communication device 106, 106'. In such cases, the second communication device 106, 106' can be configured to store the group of protocol signaling messages received and/or transmitted by the second communication device 106, 106' and provide the group of protocol signaling messages to the server 108.

In some embodiments (not shown), the functions and operations of the server 108 can be performed in a distributed manner by two or more devices without limiting the scope of the claimed subject matter. For example, a first device can be included in/communicatively coupled to the first communication device 104, 104' and a second device can be included in/communicatively coupled to the second communication device 106, 106', and the functions and operation of the server 108 can be performed in the distributed manner at the first device and the second device. Alternatively, the server 108 can be distributed within the first communication device 104, 104' and the second communication device 106, 106', and the functions and operation of the server 108 can be performed in the distributed manner at the first communication device 104, 104' and the second communication device 106, 106'. It will further be appreciated by those of ordinary skill in the art that the server 108 can alternatively function remotely, and/or within a remote server, and/or as a cloud server, and/or as any other remote computing mechanism now known or in the future developed. For ease of reference, the components and the functionality of the server 108 are described in detail hereinafter.

It should be appreciated by those of ordinary skill in the art that FIGS. 1A and 1B depict the server 108 in a simplified manner and a practical embodiment can include additional components and suitably configured logic to support known or conventional operating features that are not described in detail herein. It will further be appreciated by those of ordinary skill in the art that when the server 108 is an entity separate from the first communication device 104, 104' and/or the second communication device 106, 106', the server 108 can be a personal computer, a desktop computer, a tablet, an augmented reality device, a smartphone, a wearable device (wrist worn, eye worn), or any other such device now known or in the future developed.

The server 108 is electrically and/or communicatively coupled to at least one of the first communication device 104, 104' and the second communication device 106, 106'. In some embodiments, the server 108 includes a plurality of electrical and electronic components, for example, for providing power, operational control, and communication within the server 108. Alternatively, when the server 108 is within the first communication device 104, 104' or the second communication device 106, 106', or both, the server 108 can utilize one or more components of the first communication device 104, 104' and/or the second communication device 106, 106'. For example, in one embodiment, the server 108 includes, among other things, a server transceiver 112, a server user interface 114, a server network interface 116, a server display 118, a server processor 120, and a server memory 122.

The components of the server 108 (for example 112, 114, 116, 118, 120, 122) are communicatively coupled via a server local interface 124. The server local interface 124 includes, for example, but not limited to, one or more buses or other wired or wireless connections, as is now known in the art or in the future developed. In an embodiment, the server local interface 124 has additional elements, but which are omitted from the description for simplicity, such as controllers, buffers (caches), drivers, repeaters, and receivers, among many others, to enable communications. Further, in some embodiments, the server local interface 124 includes address, control, and/or data connections, to enable appropriate communications among the aforementioned components.

The server 108, in the illustrated example, includes the server transceiver 112. The server transceiver 112 enables communication (for example, wireless communication) between the server 108 and other devices, (for example, the first communication device 104, 104' and/or the second communication device 106, 106'). It will be appreciated by those of ordinary skill in the art that the server 108 can include one or more of a single server transceiver 112 as shown, or alternatively, separate transmitting and receiving components, for example, but not limited to, a transmitter, a transmitting antenna, a receiver, and a receiving antenna, a server transceiver antenna, and/or any combination thereof.

The server user interface 114 is used to receive one or more user inputs from and/or for providing one or more system outputs from/to the user (for example, an operator). User input is provided via, for example, one or more of a keyboard, a touchpad, a mouse, a microphone, a headset, and/or any other user input device now known or in the future developed, or any combination thereof. System output is provided via a server display 118, a server speaker (not shown), a printer (not shown) and/or any other system output device now known or in the future developed, or any combination thereof. The server user interface 114 further includes, for example, one or more serial ports, one or more parallel ports, one or more infrared (IR) interfaces or blasters, a Universal Serial Bus (USB) interface, a Bluetooth® interface, a Wireless Fidelity (Wi-Fi) interface, a Near-Field Communication (NFC) interface, and/or any other interface for wired or wireless communication, now known or in the future developed.

The server network interface 116 is used to enable the server 108 to communicate on a network, such as, the communication network 102, a Wireless Access Network (WAN), and a Radio Frequency (RF) network. The server network interface 116 includes, for example, an Ethernet card or adapter or a Wireless Local Area network (WLAN) card or adapter. Additionally, or alternatively, the server network interface 116 includes a Radio Frequency interface for wide area communications, such as Long-Term Evolution (LTE) networks, or any other network now known or in the future developed. In an embodiment, the server network interface 116 includes address, control, and/or data connections, to enable appropriate communications exchange via the communication network 102. The server display 118 can include one or more of a display screen, a projector, a monitor or any other visual output device now known or in the future developed. In accordance with some embodiments, the server display 118 is configured to display any data, images, or information to the user.

The server memory 122 includes any non-transitory memory elements comprising one or more of volatile memory elements (for example, a random access memory (RAM), nonvolatile memory elements (for example, read-only memory "ROM"), and combinations thereof). Moreover, the server memory 122 incorporates electronic, magnetic, optical, and/or other types of storage media now known or in the future developed. In some embodiments, the server memory 122 has a distributed architecture, where various components of the server memory 122 are situated remotely from one another, but are accessed by the server processor 120. The software in the server memory 122 includes or corresponds to one or more software programs, each of which includes an ordered listing of executable instructions for implementing logical functions. For example, the software in the server memory 122 includes a server operating system 128 that controls the execution of other computer programs and provides scheduling, input-output control, file and data management, memory management, and communication control and related services.

The server memory 122 further includes a server data storage 130 used to store reference data, for example, a reference order 132, a reference message order 134, a token map 136, a message token map 138, for the processing of the group of protocol signaling messages and for the identification of errors. In the exemplary embodiments of FIGS. 1A and 1B, the server data storage 130 is located internal to the server memory 122 of the server 108. Additionally, or alternatively (not shown), the server data storage 130 is located external to the server 108 such as, for example, an external hard drive connected to the server user interface 114. In some embodiments (not shown), the server data storage 130 is located external and connected to the server 108 through a corresponding network and accessed via the server network interface 116. The details related to the reference order 132, the reference message order 134, the token map 136, the message token map 138, will be described later with reference to FIGS. 2 through 13.

The server processor 120 is a hardware device that receives or issues software instructions. In an embodiment, the server processor 120 is any custom made or commercially available processor, a central processing unit (CPU), an auxiliary processor among several processors associated with the server processor 120, a semiconductor-based microprocessor, or generally any device for executing software instructions now known or in the future developed. When the server 108 is in operation, the server processor 120 is configured to execute software stored within the server memory 122, to communicate data to and from the server memory 122, and to generally control operations of the server 108 pursuant to the receipt or issuance of the software instructions.

The server processor 120 includes an artificial intelligence (AI) module 140 having one or more artificial intelligence models configured to continuously optimize the processing of the group of protocol signaling messages for identification of errors in the group of protocol signaling messages. The artificial intelligence module 140 is configured to learn and adapt itself to continuous improvement in changing environments. The artificial intelligence module 140 employs any one or combination of the following computational techniques: neural network, constraint program, fuzzy logic, classification, conventional artificial intelligence, symbolic manipulation, fuzzy set theory, evolutionary computation, cybernetics, data mining, approximate reasoning, derivative-free optimization, decision trees, soft computing, and/or other techniques now known or in the future developed.

The artificial intelligence module 140 implements an iterative learning process. The learning is based on a wide variety of learning rules or training algorithms now known or in the future developed. In an embodiment, the learning rules include, for example, one or more of back-propagation, pattern-by-pattern learning, supervised learning, and/or interpolation. The artificial intelligence module 140 is configured to implement one or more artificial intelligence algorithms to continuously optimize the processing of the group of protocol signaling messages. For example, the artificial intelligence algorithms are an artificial intelligence transformer that corresponds to a type of neural network architecture. In accordance with some embodiments, the artificial intelligence algorithm utilizes any artificial intelligence methodology, now known or in the future developed, for classification. For example, the artificial intelligence methodology utilized includes one or a combination of: Linear Classifiers (Logistic Regression, Naive Bayes Classifier); Nearest Neighbor; Support Vector Machines; Decision Trees; Boosted Trees; Random Forest; and/or Neural Networks. The artificial intelligence module 140 continually evolves specifics associated with the optimization of processing of the group of protocol signaling messages in real time with new inputs. The artificial intelligence intent is to continually optimize the processing of the group of protocol signaling messages.

The artificial intelligence module 140 includes a decoder 144 to decode one or more protocol signaling messages (and reference protocol signaling messages, discussed below) to correspondingly obtain one or more decoded protocol signaling messages (and decoded reference protocol signaling messages). Further, the artificial intelligence module 140 includes a tokenizer 142 configured to split the decoded protocol signaling messages (and the decoded reference protocol signaling messages) into smaller units and assign a token correspondingly to each smaller unit, using the one or more artificial intelligence models. In some embodiments, the tokenizer 142 is configured to assign a message token correspondingly to each decoded protocol signaling message (and the decoded reference protocol signaling message) in a group of protocol signaling messages (and a group of reference protocol signaling messages), using the one or more artificial intelligence models. It would be appreciated that the decoding of a protocol signaling message is a well-known process and the details of the decoding process are not described here for the sake of brevity. In accordance with various embodiments, the tokenizer 142 is configured to split a plurality of bytes in the decoded protocol signaling message (and the decoded reference protocol signaling message) into sets of bytes, and assign tokens correspondingly to the sets of bytes. For example, the tokens can be a number, an alphabet, a word, a subword, or any other character or their combinations thereof, now known or in the future developed, but which defines a size lesser than a size defined by their corresponding sets of bytes or decoded protocol signaling message.

The description hereinafter discusses the functions and operations performed by the server 108 with reference to FIGS. 2 through 13. Although the description hereinafter discusses the functions and operations performed by the server 108, a person skilled in the art would appreciate that, in some embodiments, the functions and operations of the server 108 are performed in a single device or in a distributed manner by two or more devices without limiting the scope of the claimed subject matter.

Figure 6:
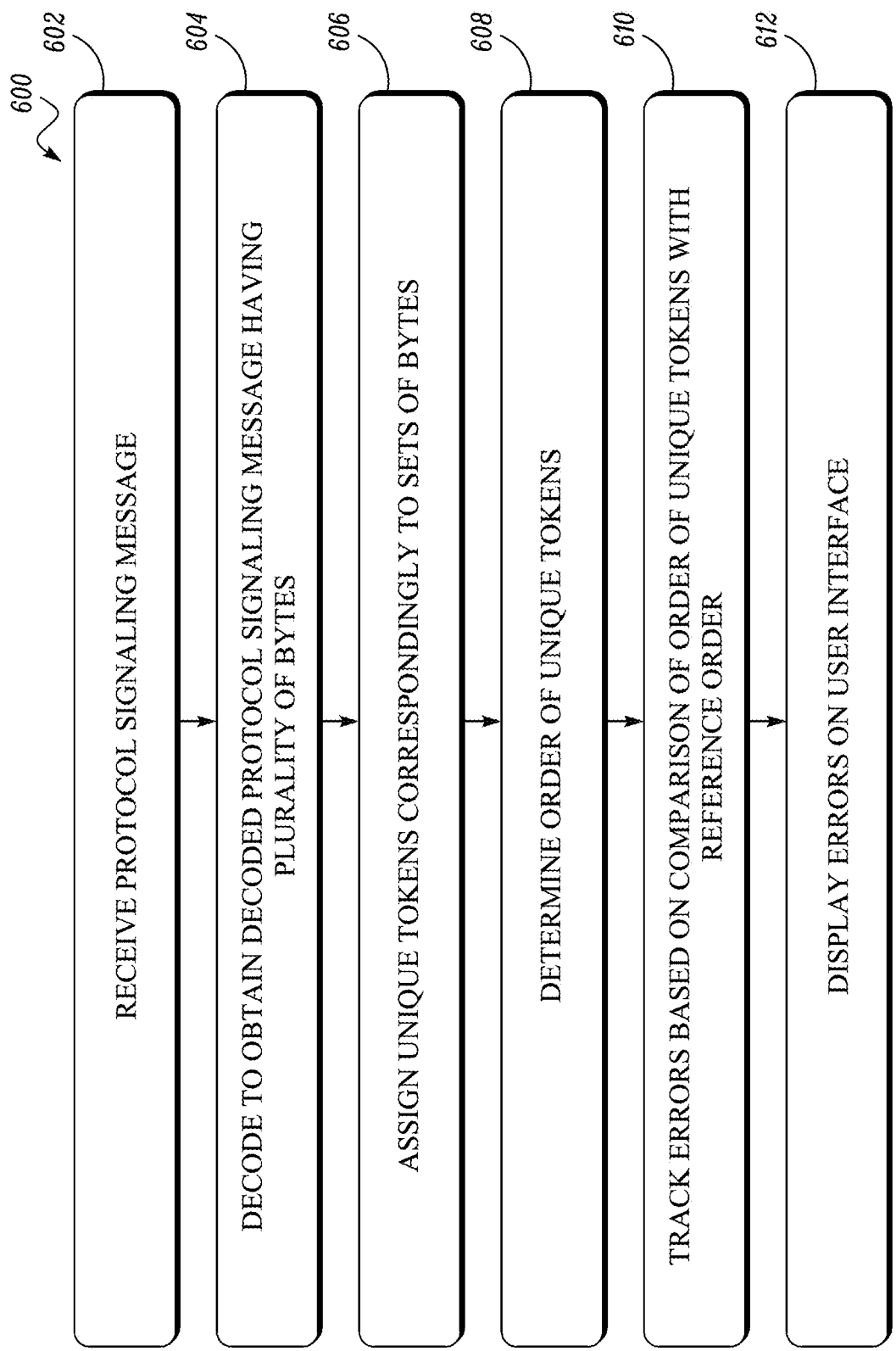
FIG. 6 is a method for optimizing processing of a protocol signaling message of the group of protocol signaling messages exchanged in the systems of FIGS. 1A and 1B for identification of errors, in accordance with some embodiments.

FIG. 6 depicts a flow diagram of a method 600 for optimizing processing of a protocol signaling message of the group of the protocol signaling message for identification of one or more errors in the protocol signaling message. In accordance with various embodiments, the artificial intelligence module 140 of the server 108 obtains a plurality of reference protocol signaling messages prior to receiving the protocol signaling message. The reference protocol signaling messages correspond to protocol signaling messages that are provided to the artificial intelligence module 140 as a reference for training the artificial intelligence models of the artificial intelligence module 140. The reference protocol signaling messages can be obtained by the artificial intelligence module 140 from one or more communication devices via the server transceiver 112 or from a user via the server user interface 114.

The decoder 144 of the artificial intelligence module 140 decodes the reference protocol signaling messages to obtain corresponding decoded reference protocol signaling messages. For example, each reference protocol signaling message is decoded based on a header information of the corresponding reference protocol signaling message. Each decoded reference protocol signaling message includes a plurality of training bytes. In accordance with various embodiments, the artificial intelligence module 140 also identifies a type (for example, RRC Configuration, RRC Connection Establishment, and so on) of each reference protocol signaling message of the plurality of reference protocol signaling messages based on the header information of the corresponding protocol signaling message, and groups one or more reference protocol signaling messages of the plurality of reference protocol signaling messages of the same type for further processing. The description below describes the steps performed for one type/group of the reference protocol signaling messages and it would be appreciated that similar steps can be performed for each type/group of the reference protocol signaling messages.

Figure 2:
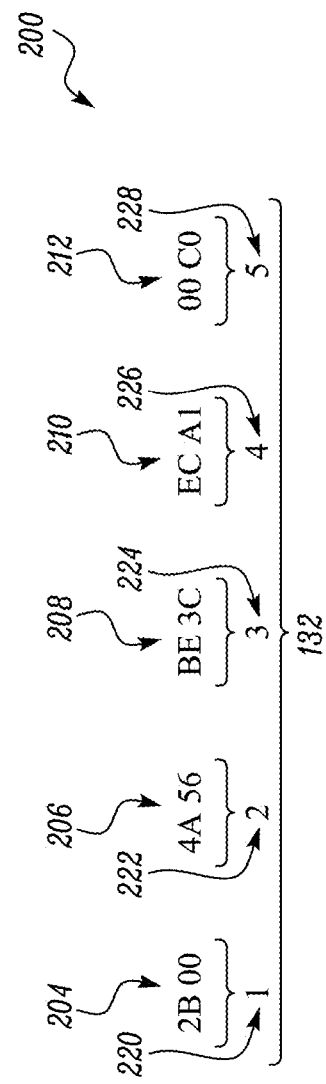
FIG. 2 illustrates an exemplary decoded reference protocol signaling message, in accordance with some embodiments.

Upon obtaining the decoded reference protocol signaling messages, the tokenizer 142 divides each decoded reference protocol signaling message of the plurality of decoded reference protocol signaling messages into sets of bytes of the plurality of training bytes. In accordance with various embodiments, each set of bytes corresponds to one or more sequences of bytes commonly occurring in the decoded reference protocol signaling messages. For example, in an exemplary decoded reference protocol signaling message 200 shown in FIG. 2, the decoded reference protocol signaling message 200 is divided into a sets of bytes 204, 206, 208, 210, 212. It would be appreciated that FIG. 2 illustrates the decoded reference protocol signaling message 200 in a simplified manner and a practical decoded reference protocol signaling message can include properties such as a header and a payload. In some embodiments, the plurality of bytes corresponds to an entire message (including the properties, such as the header and the payload) of the decoded reference protocol signaling message. In some embodiments, the plurality of bytes corresponds to one section (for example, the header or the payload) of the decoded reference protocol signaling message.

The tokenizer 142 assigns unique tokens correspondingly to the sets of bytes in each decoded reference protocol signaling message of the plurality of decoded reference protocol signaling messages. For example, in the exemplary decoded reference protocol signaling message 200 shown in FIG. 2, the set of bytes 204 (iterated as '2B 00') is assigned a unique token 220 (iterated as '1'), the set of bytes 206 (iterated as '4A 56') is assigned a unique token 222 (iterated as '2'), the set of bytes 208 (iterated as 'BE 3C') is assigned a unique token 224 (iterated as '3'), the set of bytes 210 (iterated as 'EC A1') is assigned a unique token 226 (iterated as '4'), and the set of bytes 212 (iterated as '00 C0') is assigned a unique token 228 (iterated as '5'). Although not shown, it would be appreciated that these sets of bytes 204, 206, 208, 210, 212 (shown in FIG. 2) are assigned the respective unique tokens 220, 222, 224, 226, 228 (shown in FIG. 2) in other decoded reference protocol signaling messages (belonging to the same type/group). For example, when the set of bytes 204 (shown in FIG. 2) appears in another decoded reference signaling protocol message, the same unique token 220 (shown in FIG. 2) is assigned to the set of bytes 204 in the other decoded signaling protocol message as well.

In some embodiments, different tokens are assigned to the same set of bytes appearing in different sections (for example, the header or the payload) of the decoded reference protocol signaling message. For example, a first token is assigned to the set of bytes 208 (shown in FIG. 2) when the set of bytes 208 (shown in FIG. 2) appears in the header of the decoded reference protocol signaling message and a second token different from the first token is assigned to the set of bytes 208 (shown in FIG. 2) when the set of bytes 208 (shown in FIG. 2) appears in the payload of the decoded reference protocol signaling message.

In accordance with various embodiments, a size of each unique token of the plurality of unique tokens is less than a size of a corresponding set of bytes of the sets of bytes. In some embodiments, the tokenizer 142 assigns a token with a smaller size to a set of bytes that occur more frequently in the plurality of decoded reference protocol signaling messages. To this end, the tokenizer 142 determines a frequency of occurrence of each set of bytes in the plurality of decoded reference protocol signaling messages and assigns the unique token to the set of bytes based on the frequency of occurrence of the corresponding set of bytes. For example, the tokenizer 142 assigns a first unique token of the plurality of unique tokens to the set of bytes when the frequency of occurrence of the set of bytes in the sets of bytes is greater than a token threshold frequency and assigns a second unique token of the plurality of unique tokens to the set of bytes when the frequency of occurrence of the set of bytes in the sets of bytes is lesser than the token threshold frequency. In such scenarios, a size of the first unique token is smaller than a size of the second unique token.

In accordance with various embodiments, the tokenizer 142 stores the mapping between the sets of bytes occurring in the plurality of decoded reference protocol signaling messages and the assigned unique tokens as the token map 136 in the server data storage 130. In some embodiments, the tokenizer 142 stores the frequency of occurrence of each set of bytes along with other metadata (such as, a type of reference protocol signaling message) in the token map 136. For example, FIG. 3 shows an exemplary token map 136 including the mapping between the sets of bytes and the assigned unique tokens. Further, it would be appreciated that the mapping in the token map 136 is not limited to the sets of bytes corresponding to the decoded reference protocol signaling message 200 (shown in FIG. 2) and includes all unique sets of bytes occurring in the plurality of decoded reference protocol signaling messages.

The artificial intelligence module 140 determines a training order of the plurality of unique tokens in each decoded reference protocol signaling message of the plurality of decoded reference protocol signaling messages (belonging to the same group/type). The training order is an order in which the unique tokens appear/occur in the decoded reference protocol signaling messages. In accordance with various embodiments, the training order corresponds to the order of the corresponding sets of bytes in the decoded protocol signaling message. For example, in the exemplary decoded reference protocol signaling message 200 shown in FIG. 2, the training order of the unique tokens corresponds to '12345'.

The artificial intelligence module 140 identifies the plurality of unique tokens with the training order as the reference order 132 (shown in FIGS. 1A, 1B, and 2) when a number of the plurality of unique tokens with the training order in the plurality of decoded reference protocol signaling messages exceeds a threshold number. The threshold number can be defined by the user or automatically determined by the artificial intelligence module 140 and can vary over time. In accordance with various embodiments, the reference order 132 (shown in FIGS. 1A, 1B, and 2) corresponds to a valid order of the plurality of unique tokens in a particular type of a decoded protocol signaling message (determined by the artificial intelligence module 140 based on the threshold number). In some embodiments, the reference order 132 (shown in FIGS. 1A, 1B, and 2) can include more than one reference orders that are valid orders of the plurality of unique tokens in a particular type of a decoded protocol signaling message. For ease of understanding of the description below, it is assumed that the training order '12345' depicted in FIG. 2 is the reference order 132 (shown in FIGS. 1A, 1B, and 2) determined by the artificial intelligence module 140.

The method 600 begins upon identification of the reference order 132 (shown in FIGS. 1A, 1B, and 2). At 602, the server processor 120 receives the protocol signaling message via the server transceiver 112. The protocol signaling message is any control message exchanged between the first communication device 104, 104' and the second communication device 106, 106' over the communication network 102 and is obtained from the first communication device 104, 104' and/or the second communication device 106, 106' by the server 108.

At 604, the decoder 144 of the server processor 120 decodes the protocol signaling message to obtain a decoded protocol signaling message having a plurality of bytes. For example, the protocol signaling message is decoded based on a header information of the protocol signaling message. In accordance with various embodiments, the artificial intelligence module 140 also identifies a type (for example, RRC Configuration, RRC Connection Establishment, and so on) of the protocol signaling message based on the header information of the protocol signaling message.

Figure 4:
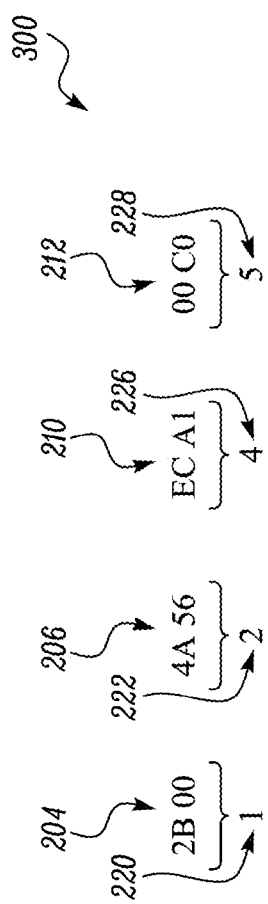
FIG. 4 illustrates an exemplary decoded protocol signaling message of the group of protocol signaling messages exchanged in the systems of FIGS. 1A and 1B, in accordance with some embodiments.

At 606, the tokenizer 142 assigns a plurality of unique tokens correspondingly to sets of bytes of the plurality of bytes. To this end, the tokenizer 142 divides the plurality of bytes of the decoded protocol signaling message into sets of bytes. For example, in an exemplary decoded protocol signaling message 300 shown in FIG. 4, sets of bytes 204, 206, 210, 212 of the decoded protocol signaling message 300 are correspondingly assigned unique tokens 220, 222, 226, 228. In accordance with various embodiments, the tokenizer 142 assigns the plurality of unique tokens 220, 222, 226, 228 correspondingly to the sets of bytes 204, 206, 210, 212 based on a prestored mapping between the sets of bytes and the plurality of unique tokens stored in the token map 136 of FIG. 3. It would be appreciated that FIG. 4 illustrates the decoded protocol signaling message 300 in a simplified manner and a practical decoded protocol signaling message includes a header and a payload. In some embodiments, the plurality of bytes corresponds to an entire message (including the header and the payload) of the decoded protocol signaling message. In some embodiments, the plurality of bytes corresponds to one section (for example, the header or the payload) of the decoded protocol signaling message.

Referring back to FIG. 6, at 608, the artificial intelligence module 140 determines an order of the plurality of unique tokens in the decoded protocol signaling message. The order is an order in which the plurality of unique tokens occurs in the decoded protocol signaling message. In accordance with various embodiments, the order corresponds to the order of the corresponding sets of bytes in the decoded protocol signaling message. For example, in the exemplary decoded protocol signaling message 300 shown in FIG. 4, the order of the unique tokens corresponds to '1245'.

Figure 5:
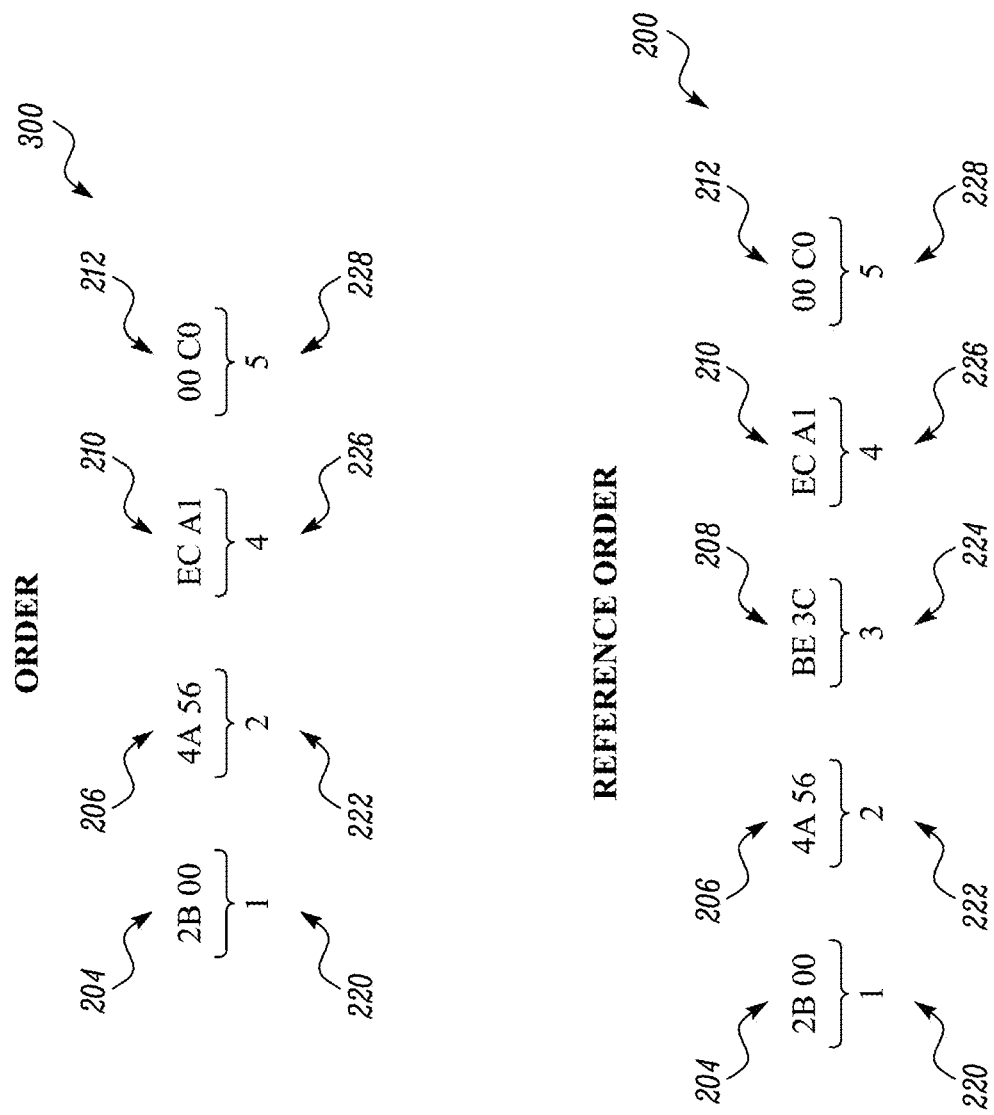
FIG. 5 illustrates an exemplary error tracking in the decoded protocol signaling message of FIG. 4, in accordance with some embodiments.

Referring back to FIG. 6, at 610, the artificial intelligence module 140 tracks one or more errors in the protocol signaling message based on a comparison of the order of the plurality of unique tokens with the reference order 132 (shown in FIGS. 1A, 1B, and 2) of the plurality of reference protocol signaling messages received by the server 108 prior to receiving the protocol signaling message. To this end, the artificial intelligence module 140 compares the order of the unique tokens in the decoded protocol signaling message with the reference order(s) 132 (shown in FIGS. 1A, 1B, and 2) corresponding to similar type/group of the decoded reference protocol signaling messages. For example, as shown in FIG. 5, the order '1245' of the unique tokens in the decoded protocol signaling message 300 is compared with the reference order '12345' to track errors in the decoded protocol signaling message.

In accordance with various embodiments, the errors correspond to a missing set of bytes corresponding to a missing unique token or a change in the order of the unique tokens in the decoded protocol signaling message. For example, in the exemplary embodiment discussed above, the artificial intelligence module 140 determines that the set of bytes corresponding to the unique token '3' is missing from the decoded protocol signaling message 300.

Referring back to FIG. 6, at 612, the server processor 120 displays the errors in the protocol signaling message on a user interface, for example, the server user interface 114. In some embodiments, the server processor 120 can instruct any other device (for example, the first communication device 104, 104' or the second communication device 106, 106') to display the errors on its user interface. In some embodiments, the server processor 120 displays the errors in a binary form of 0 or 1. In some embodiments, the errors can be described in textual format.

Figure 7:
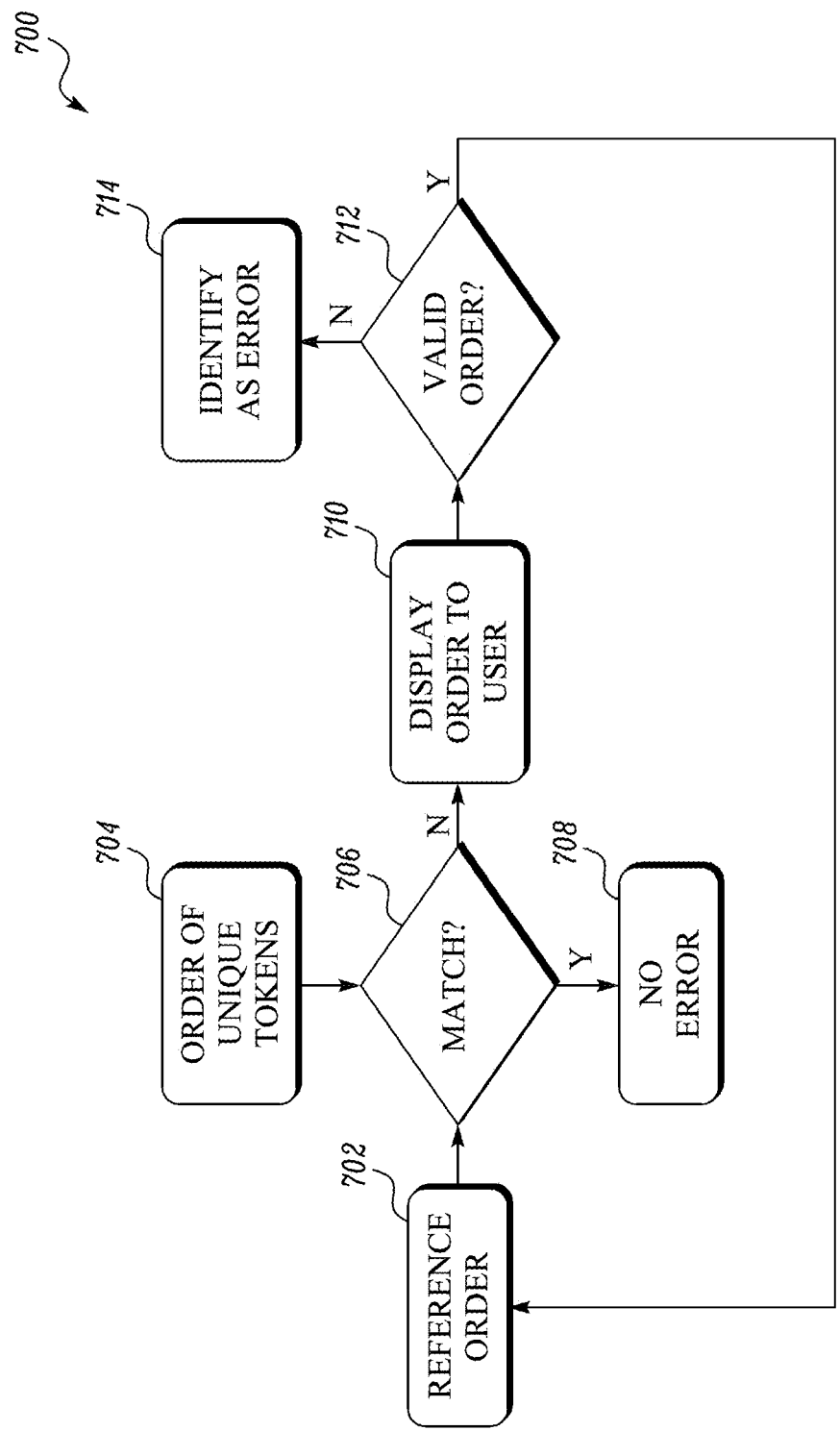
FIG. 7 is a method for continuously optimizing processing of one or more subsequent protocol signaling messages for identification of errors, in accordance with some embodiments.

FIG. 7 illustrates a method 700 for continuously optimizing the processing of one or more subsequent protocol signaling messages for identification of errors. At 702, the reference order 132 (shown in FIGS. 1A, 1B, and 2) is provided to the artificial intelligence module 140. At 704, the decoded protocol signaling message is provided to the artificial intelligence module 140. At 706, the artificial intelligence module 140 compares the reference order 132 (shown in FIGS. 1A, 1B, and 2) with the order of the plurality of unique tokens in the decoded protocol signaling message. At 708, when the reference order 132 (shown in FIGS. 1A, 1B, and 2) matches the order of the plurality of unique tokens in the decoded protocol signaling message, the artificial intelligence module 140 determines that there is no error in the decoded protocol signaling message. At 710, when the reference order 132 (shown in FIGS. 1A, 1B, and 2) deviates from the order of the plurality of unique tokens in the decoded protocol signaling message, the artificial intelligence module 140 displays the order of the plurality of unique tokens in the decoded protocol signaling message on the user interface, for example, the server user interface 114 or corresponding user interfaces of the first communication device 104, 104' and the second communication device 106, 106'. At 712, the artificial intelligence module 140 obtains a confirmation associated with a validity of the displayed order of the plurality of unique tokens via the user interface. When the confirmation that the displayed order is valid is received, the artificial intelligence module 140 identifies the displayed order of the plurality of unique tokens as another reference order (corresponding to the type/group of the decoded protocol signaling message). At 714, when no confirmation is received or when a notification indicating the displayed order as not valid is received, the artificial intelligence module 140 identifies the displayed order as an error. In some embodiments, the artificial intelligence module 140, during validation, can also identify the location of the error and the error itself and display the same on the user interface. In accordance with various embodiments, the artificial intelligence module 140 repeats the above indicated steps of displaying, obtaining, and identifying for each subsequent protocol signaling message when an order of a plurality of unique tokens in the corresponding subsequent protocol signaling message deviates from the reference order 132 (shown in FIGS. 1A, 1B, and 2) and the another reference order.

Figure 12:
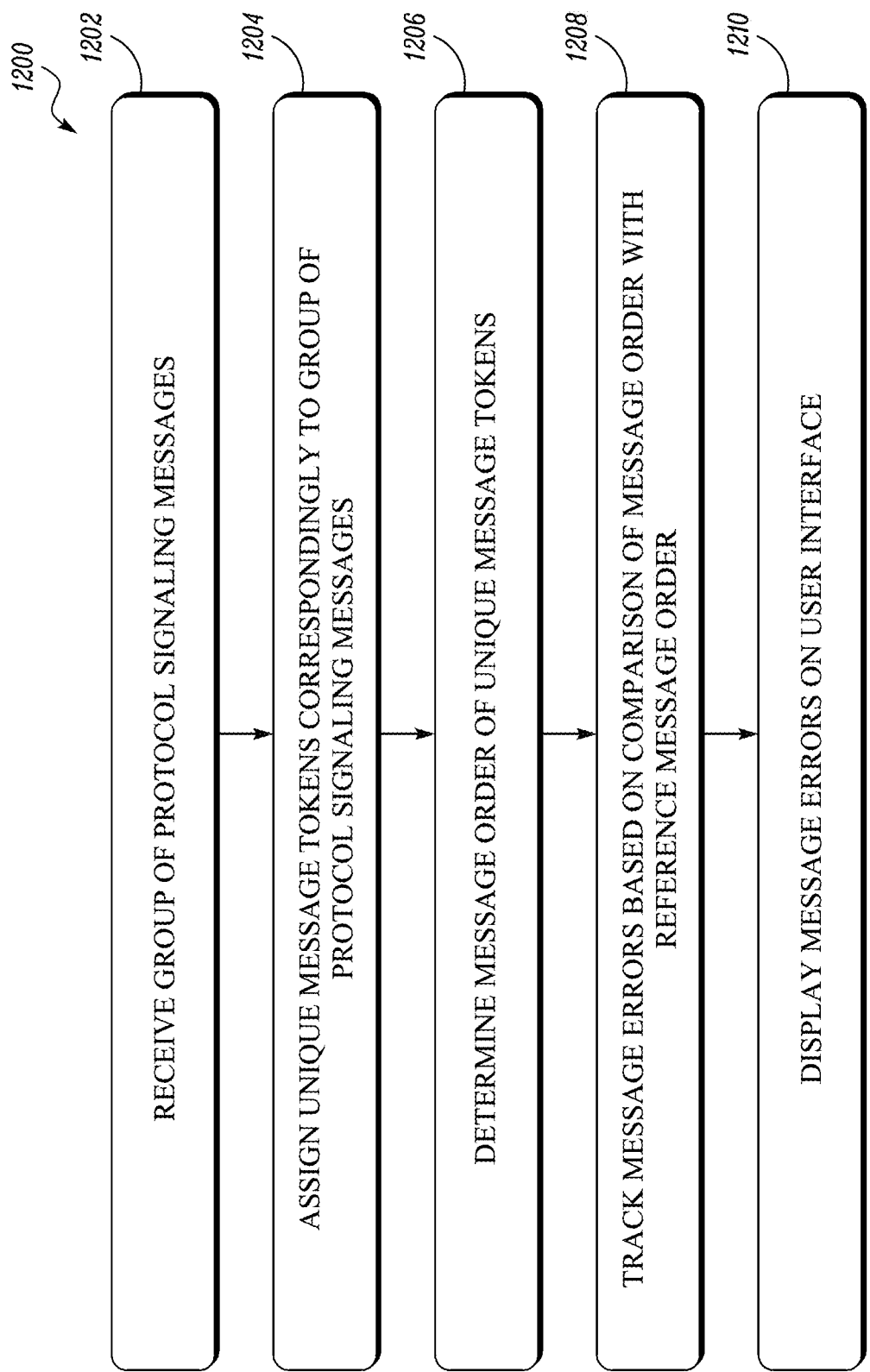
FIG. 12 is a method for optimizing processing of the exemplary group of protocol signaling messages for identification of message errors, in accordance with some embodiments.

FIG. 12 depicts a flow diagram of a method 1200 for optimizing processing of the group of protocol signaling messages for identification of one or more message errors in the group of protocol signaling messages. The group of protocol signaling messages includes a protocol signaling message and one or more additional protocol signaling messages exchanged between the first communication device 104, 104' and the second communication device 106, 106' over the communication network 102. In accordance with various embodiments, the one or more additional protocol signaling messages are exchanged in sequence to the protocol signaling message.

The artificial intelligence module 140 of the server 108 obtains a plurality of groups of reference protocol signaling messages prior to receiving the protocol signaling message and the one or more additional protocol signaling messages. The group of reference protocol signaling messages includes one or more protocol signaling messages that are exchanged in a sequence. The group of reference protocol signaling messages are provided to the artificial intelligence module 140 as a reference for training the artificial intelligence models of the artificial intelligence module 140. The group of reference protocol signaling messages can be obtained by the artificial intelligence module 140 from one or more communication devices via the server transceiver 112 or from the user via the server user interface 114.

Figure 8:
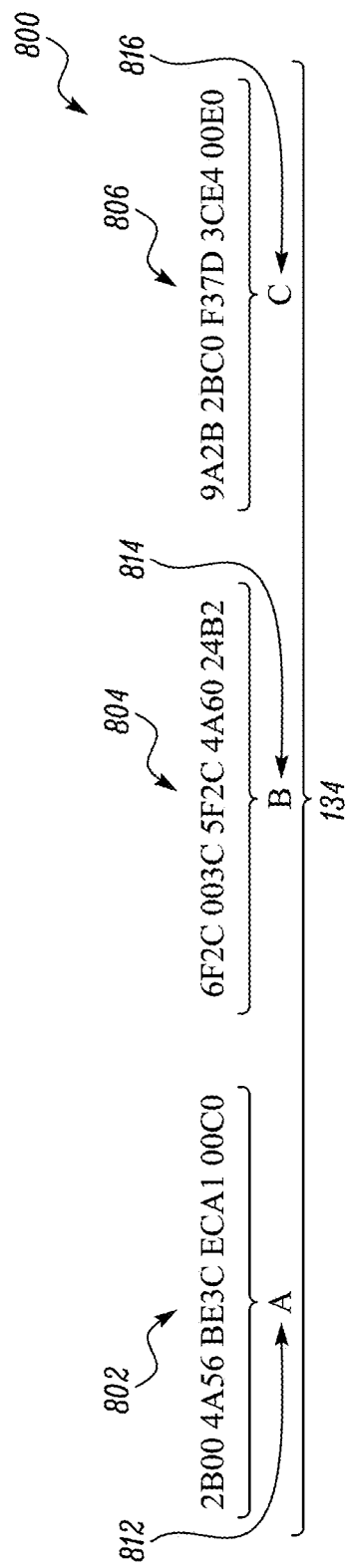
FIG. 8 illustrates an exemplary group of decoded reference protocol signaling messages, in accordance with some embodiments.

The tokenizer 142 assigns a plurality of unique message tokens correspondingly to a plurality of reference protocol signaling messages in each group of reference protocol signaling messages of the plurality of groups of reference protocol signaling messages. In some embodiments, prior to the assignment of the unique message tokens, the decoder 144 of the artificial intelligence module 140 decodes the plurality of reference protocol signaling messages in each group of reference protocol signaling messages to obtain corresponding plurality of decoded reference protocol signaling messages. As discussed above, each reference protocol signaling message is decoded based on a header information of the corresponding reference protocol signaling message. For example, in an exemplary group 800 of reference protocol signaling messages shown in FIG. 8, the group 800 includes three (3) decoded reference protocol signaling messages 802, 804, 806 (hereinafter interchangeably referred to as reference protocol signaling messages). It would be appreciated that FIG. 8 illustrates the decoded reference protocol signaling messages 802, 804, 806 and the group 800 in a simplified manner and a practical group of decoded reference protocol signaling messages can include more than three (3) decoded reference protocol signaling messages with properties such, as a header and a payload.

The tokenizer 142 assigns a plurality of unique message tokens correspondingly to the plurality of reference protocol signaling messages (for example, the plurality of decoded reference protocol signaling messages) in each group of reference protocol signaling messages. For example, in the exemplary group 800, the reference protocol signaling message 802 (iterated as '2B 00 4A 56 BE 3C EC A1 00 C0') is assigned a unique message token 812 (iterated as 'A'), the reference protocol signaling message 804 (iterated as '6F 2C 00 3C 5F 2C 4A 60 24 B2) is assigned a unique message token 814 (iterated as 'B'), and the reference protocol signaling message 806 (iterated as '9A 2B 2B C0 F3 7D 3C E4 00 E0') is assigned a unique message token 816 (iterated as 'C'). Although not shown, it would be appreciated that these reference protocol signaling messages (shown in FIG. 8) are assigned the respective unique message tokens 812, 814, 816 (shown in FIG. 8) in other groups of the reference protocol signaling messages. For example, when the reference protocol signaling message 802 (shown in FIG. 8) appears in another group of reference signaling protocol messages, the same unique message token 812 (shown in FIG. 8) is assigned to the reference protocol signaling message 802 in the other group as well.

In accordance with various embodiments, a size of each unique message token of the plurality of unique message tokens is less than a size of a corresponding reference protocol signaling message. In some embodiments, the tokenizer 142 assigns a message token with a smaller size to a reference protocol signaling message that occurs more frequently in the plurality of groups of reference protocol signaling messages. To this end, the tokenizer 142 determines a frequency of occurrence of each reference protocol signaling message in the plurality of groups of reference protocol signaling messages and assigns the unique message token to the reference protocol signaling message based on the frequency of occurrence of the corresponding reference protocol signaling message. For example, the tokenizer 142 assigns a first unique message token of the plurality of unique message tokens to the reference protocol signaling message when the frequency of occurrence of the reference protocol signaling message in the plurality of groups of reference protocol signaling messages is greater than a message token threshold frequency and a second unique message token of the plurality of unique message tokens to the reference protocol signaling message when the frequency of occurrence of the reference protocol signaling message in the plurality of groups of reference protocol signaling messages is lesser than the message token threshold frequency. In such scenarios, a size of the first unique message token is smaller than a size of the second unique message token.

In accordance with various embodiments, the tokenizer 142 stores the mapping between each reference protocol signaling message occurring in the plurality of groups of reference protocol signaling messages and the assigned unique message tokens as the message token map 138 (see FIG. 9) in the server data storage 130. In some embodiments, the tokenizer 142 stores the frequency of occurrence of each reference protocol signaling message along with other metadata (such as, a type of reference protocol signaling message) in the message token map 138. For example, FIG. 9 shows an exemplary message token map 138 including the mapping between the reference protocol signaling messages and the assigned unique message tokens. Further, it would be appreciated that the mapping in the message token map 138 is not limited to the reference protocol signaling messages corresponding to the group 800 (shown in FIG. 8) and includes all unique reference protocol signaling messages occurring in the plurality of groups of reference protocol signaling messages.

The artificial intelligence module 140 determines a training message order of the plurality of unique message tokens in each group of reference protocol signaling messages of the plurality of groups of reference protocol signaling messages. The training message order is an order in which the unique message tokens appear/occur in the group of reference protocol signaling messages. In accordance with various embodiments, the training message order corresponds to the order of the corresponding protocol signaling message in a group of protocol signaling messages. For example, in the exemplary group 800 shown in FIG. 8, the training order of the unique message tokens corresponds to 'ABC'.

The artificial intelligence module 140 identifies the plurality of unique message tokens with the training message order as the reference message order 134 (shown in FIGS. 1A, 1B, and 8) when a number of the plurality of unique message tokens with the training message order in the plurality of groups of reference protocol signaling messages exceeds a message threshold number. The message threshold number can be defined by the user or automatically determined by the artificial intelligence module 140 and can vary with time. In accordance with various embodiments, the reference message order 134 (shown in FIGS. 1A, 1B, and 8) corresponds to a valid order of the plurality of unique message tokens in a group of reference protocol signaling messages (determined by the artificial intelligence module 140 based on the message threshold number). In some embodiments, the reference message order 134 (shown in FIGS. 1A, 1B, and 8) can include more than one reference message orders that are valid orders of the plurality of unique message tokens in a group of reference protocol signaling messages. For ease of understanding of the description below, it is assumed that the training message order 'ABC' depicted in FIG. 8 is the reference message order 134 (shown in FIGS. 1A, 1B, and 8) determined by the artificial intelligence module 140.

The method 1200 begins upon identification of the reference message order 134 (shown in FIGS. 1A, 1B, and 8). At 1202, the server processor 120 receives the protocol signaling message and the one or more additional protocol signaling messages via the server transceiver 112. The protocol signaling message and the one or more additional protocol signaling messages are control messages exchanged in sequence between the first communication device 104, 104' and the second communication device 106, 106' over the communication network 102 and are obtained from the first communication device 104, 104' and/or the second communication device 106, 106' by the server 108.

Figure 10:
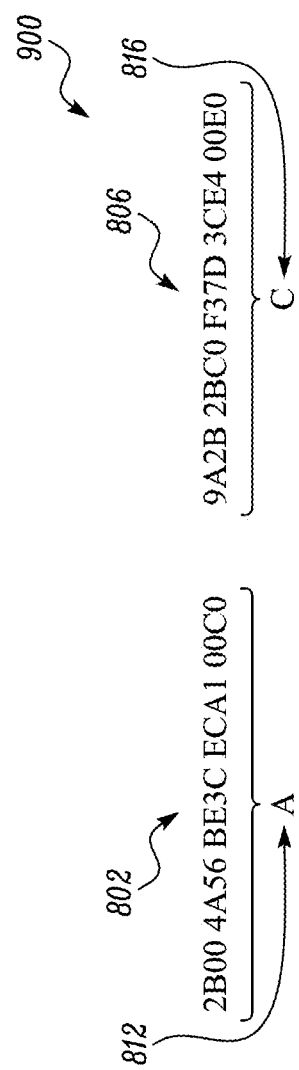
FIG. 10 illustrates the exemplary group of decoded protocol signaling messages exchanged in the systems of FIGS. 1A through 1B, in accordance with some embodiments.

At 1204, the tokenizer 142 assigns a plurality of unique message tokens correspondingly to the protocol signaling message and the one or more additional protocol signaling messages. In some embodiments, prior to the assignment of the unique tokens, the decoder 144 in the server processor 120 decodes the protocol signaling message and the one or more additional protocol signaling messages to obtain a decoded protocol signaling message and the one or more additional decoded protocol signaling messages, respectively. For example, the protocol signaling message and the one or more additional protocol signaling messages are decoded based on a header information of the corresponding protocol signaling message. For example, FIG. 10 illustrates an exemplary group 900 of protocol signaling messages including a decoded protocol signaling message 802 (hereinafter interchangeably referred to as the protocol signaling message 802) and an additional decoded protocol signaling message 804 (hereinafter interchangeably referred to as the additional protocol signaling message 806).

The tokenizer 142 assigns the plurality of unique message tokens 812, 816 correspondingly to the protocol signaling messages 802, 806 based on a prestored mapping between the protocol signaling messages and the plurality of unique message tokens stored in the message token map 138 of FIG. 9. In accordance with various embodiments, a size of each unique message token of the plurality of unique message tokens is less than a size of a corresponding protocol signaling message or the one or more additional protocol signaling messages. It would be appreciated that FIG. 10 illustrates the protocol signaling messages 802, 806 and the group 900 in a simplified manner and a practical group of protocol signaling messages can include more than two (2) protocol signaling messages with properties such, as a header and a payload.

In some embodiments, the protocol signaling message corresponds to an entire message (including the header and the payload) of the protocol signaling message. In some embodiments, the protocol signaling messages corresponds to one section (for example, the header or the payload) of the protocol signaling message.

Referring back to FIG. 12, at 1206, the artificial intelligence module 140 determines a message order of the plurality of unique message tokens. The message order is an order in which the plurality of unique message tokens occurs in a group of the protocol signaling messages. In accordance with various embodiments, the message order corresponds to the order of the corresponding protocol signaling messages in the group of protocol signaling messages. For example, in the exemplary group 900 shown in FIG. 10, the order of the unique message tokens corresponds to 'AC'.

Figure 11:
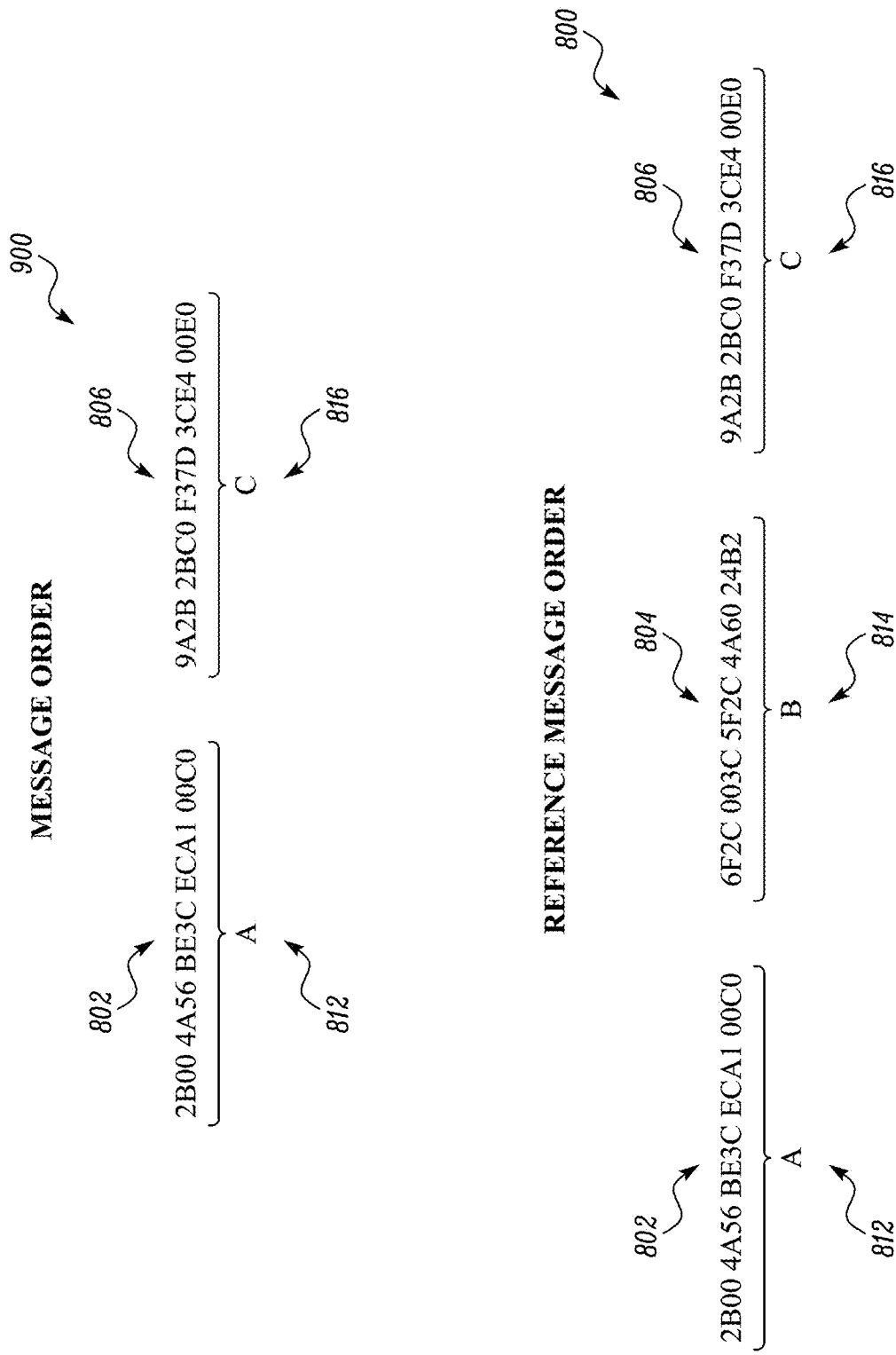
FIG. 11 illustrates an exemplary message error tracking in the group of decoded protocol signaling messages of FIG. 10, in accordance with some embodiments.

Referring back to FIG. 12, at 1208, the artificial intelligence module 140 tracks one or more message errors in the protocol signaling message and the additional protocol signaling message based on a comparison of the message order of the plurality of unique message tokens with the reference message order 134 (shown in FIGS. 1A, 1B, and 8). To this end, the artificial intelligence module 140 compares the message order of the unique message tokens in the group of protocol signaling messages with the reference message order(s) 134 (shown in FIGS. 1A, 1B, and 8). For example, as shown in FIG. 11, the order 'AC' of the unique message tokens in the group 900 is compared with the reference message order 'ABC' to track message errors in the group 900.

In accordance with various embodiments, the message errors correspond to a missing protocol signaling message corresponding to a missing unique message token or a change in the order of the unique message tokens in the group of protocol signaling messages. For example, in the exemplary embodiment discussed above, the artificial intelligence module 140 determines that the protocol signaling message corresponding to the unique token 'B' is missing from the group 900.

Referring back to FIG. 12, at 1210, the server processor 120 displays the message errors in the group on the user interface, for example, the server user interface 114. In some embodiments, the server processor 120 can instruct any other device (for example, the first communication device 104, 104' or the second communication device 106, 106') to display the message errors on its user interface.

In some embodiments, the artificial intelligence module 140 also determines time stamps associated with the protocol signaling message and the one or more additional protocol signaling messages exchanged between the first communication device 104, 104' and the second communication device 106, 106' and displays a notification on the user interface when a time difference between the time stamps is greater than a predefined time difference.

Figure 13:
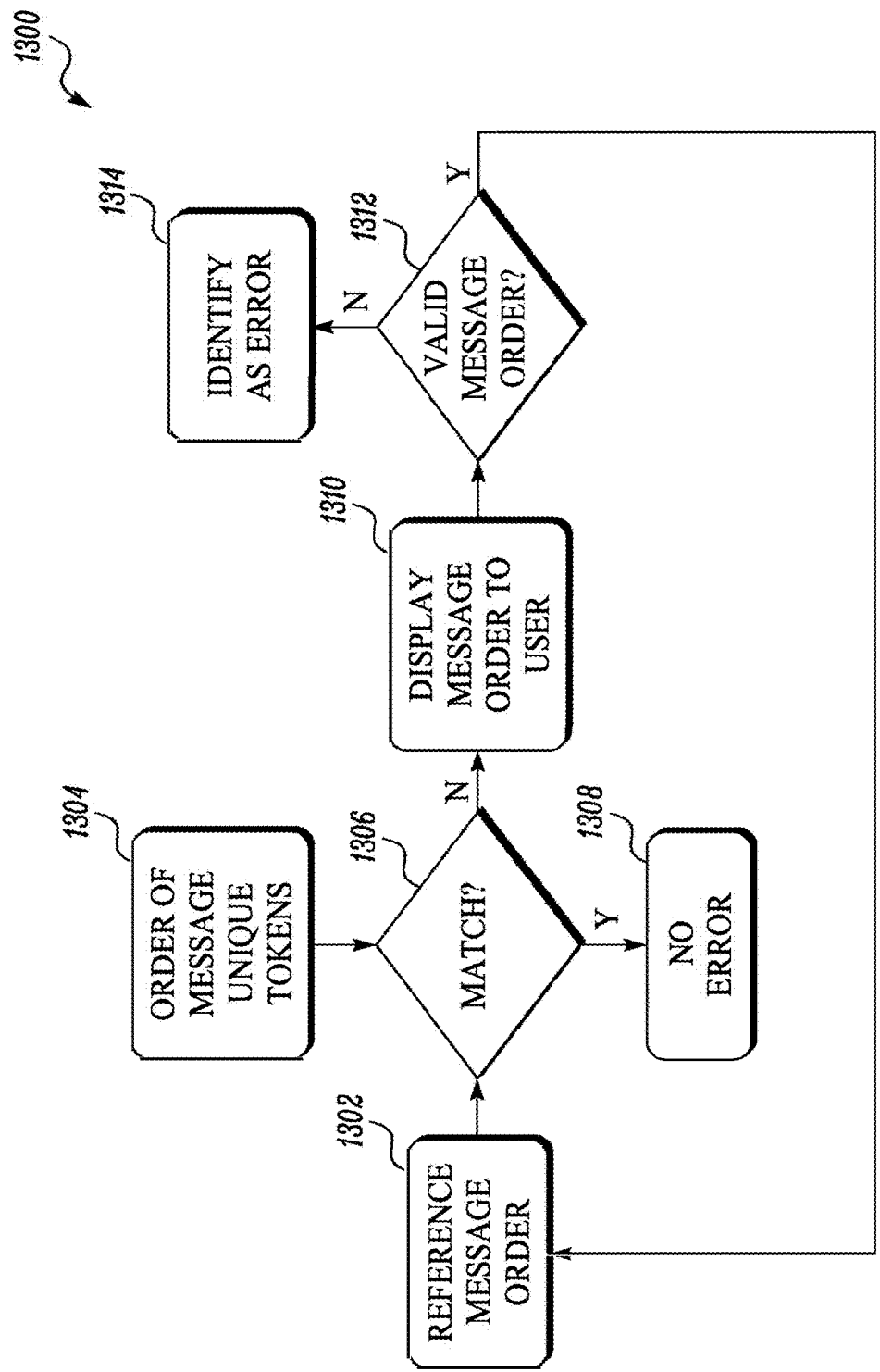
FIG. 13 illustrates a method for continuously optimizing the processing of one or more subsequent groups of protocol signaling messages for identification of message errors, in accordance with some embodiments.

FIG. 13 illustrates a method 1300 for continuously optimizing the processing of one or more subsequent groups of protocol signaling messages for identification of message errors. At 1302, the reference message order 134 (shown in FIGS. 1A, 1B, and 8) is provided to the artificial intelligence module 140. At 1304, the group of protocol signaling messages is provided to the artificial intelligence module 140. At 1306, the artificial intelligence module 140 compares the reference message order 134 (shown in FIGS. 1A, 1B, and 8) with the message order of the plurality of unique message tokens in the group. At 1308, when the reference message order 134 (shown in FIGS. 1A, 1B, and 8) matches the message order of the plurality of unique message tokens in the group, the artificial intelligence module 140 determines that there is no message error in the group. At 1310, when the reference message order 134 (shown in FIGS. 1A, 1B, and 8) deviates from the message order of the plurality of unique message tokens in the group, the artificial intelligence module 140 displays the message order of the plurality of unique message tokens in the group on the user interface, for example, the server user interface 114 or corresponding user interfaces of the first communication device 104, 104' and the second communication device 106, 106'. At 1312, the artificial intelligence module 140 obtains a confirmation associated with a validity of the displayed message order of the plurality of unique message tokens via the user interface. When the confirmation that the displayed message order is valid is received, the artificial intelligence module 140 identifies the displayed message order of the plurality of unique message tokens as another reference message order. At 1314, when no confirmation is received or when a notification indicating the displayed message order as not valid is received, the artificial intelligence module 140 identifies the displayed message order as an error. In accordance with various embodiments, the artificial intelligence module 140 repeats the above indicated steps of displaying, obtaining, and identifying for each subsequent group of protocol signaling messages when an order of a plurality of unique message tokens in the corresponding subsequent group deviates from the reference message order 134 (shown in FIGS. 1A, 1B, and 8) and the another message reference order.

The system and the method of the present disclosure are directed towards continuously optimizing the processing of protocol signaling messages for identification of errors. By tokenizing the sets of bytes or even the protocol signaling messages with tokens having a size less than the size of the corresponding set of bytes or the protocol signaling message, the processing speed of the server 108 to process the protocol signaling messages, and the like messages, can be increased to an extent that the identification of the errors can be performed in real-time. Moreover, the assignment of tokens of a smaller size to a set of bytes or a protocol signaling message that occurs more frequently in the protocol signaling messages further improves the processing speed of the server 108.

The artificial intelligence module 140 ensures that the processing of protocol signaling messages is continuously optimized by continuously learning about the new reference orders or the reference message orders. Furthermore, the information, such as, missing protocol signaling messages or missing sets of bytes, can also be used in simulations to identify or predict locations for various communication devices such as a base station. Further, by way of the systems 100, 100', malware detection of protocol signaling messages deviating from the reference orders or the reference message orders may be improved, thereby providing network security.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises", "comprising", "has", "having", "includes", "including," "contains", "containing", or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A system comprising:
   a communication network;
   at least two communication devices configured to exchange a protocol signaling message over the communication network;
   a server communicatively coupled to at least one communication device of the at least two communication devices over the communication network to optimize processing of the protocol signaling message for identification of errors in the protocol signaling message, the server configured to:
   receive, by a server transceiver, the protocol signaling message;
   decode, by a server processor, the protocol signaling message to obtain a decoded protocol signaling message, the decoded protocol signaling message having a plurality of bytes;
   assign, by the server processor, a plurality of unique tokens correspondingly to sets of bytes of the plurality of bytes;
   determine, by the server processor, an order of the plurality of unique tokens in the decoded protocol signaling message;
   track, by the server processor using one or more artificial intelligence models, one or more errors in the protocol signaling message based on a comparison of the order of the plurality of unique tokens with a reference order of a plurality of reference protocol signaling messages received by the server prior to receiving the protocol signaling message; and
   display, by the server processor, the one or more errors in the protocol signaling message on a user interface.

2. The system of claim 1, wherein the server is configured to:
   display, by the server processor, the order of the plurality of unique tokens in the decoded protocol signaling message on the user interface when the order of the plurality of unique tokens deviates from the reference order;
   obtain, by the server processor, a confirmation associated with a validity of the displayed order of the plurality of unique tokens via the user interface;
   identify, by the server processor, the displayed order of the plurality of unique tokens as an another reference order upon receiving the confirmation; and
   repeat, by the server processor using the one or more artificial intelligence models, the steps of displaying, obtaining, and identifying for each subsequent protocol signaling message when an order of a plurality of unique tokens in the corresponding subsequent protocol signaling message deviates from the reference order and the another reference order.

3. The system of claim 1, wherein the server is configured to determine the reference order by:
   obtaining, by the server transceiver, the plurality of reference protocol signaling messages prior to receiving the protocol signaling message;
   decoding, by the server processor, the plurality of reference protocol signaling messages to obtain corresponding decoded reference protocol signaling messages;
   dividing, by the server processor using the one or more artificial intelligence models, each decoded reference protocol signaling message of the plurality of decoded reference protocol signaling messages into the sets of bytes;
   assigning, by the server processor using the one or more artificial intelligence models, the plurality of unique tokens correspondingly to the sets of bytes in each decoded reference protocol signaling message of the plurality of decoded reference protocol signaling messages;

determining, by the server processor using the one or more artificial intelligence models, a training order of the plurality of unique tokens in each decoded reference protocol signaling message of the plurality of decoded reference protocol signaling messages; and identifying, by the server processor using the one or more artificial intelligence models, the plurality of unique tokens with the training order as the reference order when a number of the plurality of unique tokens with the training order in the plurality of decoded reference protocol signaling messages exceeds a threshold number.

4. The system of claim 3, wherein the server is further configured to:

determine, by the server processor, a frequency of occurrence of a set of bytes of the sets of bytes in the plurality of decoded reference protocol signaling messages;

assign, by the server processor, a first unique token of the plurality of unique tokens to the set of bytes when the frequency of occurrence of the set of bytes in the sets of bytes is greater than a token threshold frequency; and assign, by the server processor, a second unique token of the plurality of unique tokens to the set of bytes when the frequency of occurrence of the set of bytes in the sets of bytes is lesser than the token threshold frequency, wherein a size of the first unique token is smaller than a size of the second unique token.

5. The system of claim 1, wherein a size of each unique token of the plurality of unique tokens is less than a size of a corresponding set of bytes of the sets of bytes.

6. The system of claim 1, wherein the server is configured to assign the plurality of unique tokens correspondingly to the sets of bytes based on a prestored mapping between the sets of bytes and the plurality of unique tokens.

7. The system of claim 1, wherein the plurality of bytes corresponds to a header or a payload of the decoded protocol signaling message.

8. A system comprising:

a communication network;

at least two communication devices configured to exchange a group of protocol signaling message including a protocol signaling message and one or more additional protocol signaling messages over the communication network, wherein the one or more additional protocol signaling messages are exchanged in sequence to the protocol signaling message;

a server communicatively coupled to at least one communication device of the at least two communication devices over the communication network to optimize processing of the protocol signaling message and the one or more additional protocol signaling messages for identification of message errors, the server configured to:

receive, by a server transceiver, the protocol signaling message and the one or more additional protocol signaling messages;

assign, by a server processor, a plurality of unique message tokens correspondingly to the protocol signaling message and the one or more additional protocol signaling messages;

determine, by the server processor, a message order of the plurality of unique message tokens;

track, by the server processor using one or more artificial intelligence models, one or more message errors in the protocol signaling message and the one or more additional protocol signaling messages based on a comparison of the message order of the plurality of unique message tokens with a reference message order of a plurality of groups of reference protocol signaling messages received by the server prior to receiving the protocol signaling message and the one or more additional protocol signaling messages; and display, by the server processor, the one or more message errors on a user interface.

9. The system of claim 8, wherein the server is further configured to:

display, by the server processor, the message order of the plurality of unique message tokens on the user interface when the message order of the plurality of unique message tokens deviates from the reference message order;

obtain, by the server processor, a confirmation associated with a validity of the displayed message order of the plurality of unique message tokens via the user interface;

identify, by the server processor, the displayed message order of the plurality of unique message tokens as another reference message order upon receiving the confirmation; and repeat, by the server processor using the one or more artificial intelligence models, the steps of displaying, obtaining, and identifying for another group of two or more protocol signaling messages when a message order of the plurality of unique message tokens in the corresponding another group of the two or more protocol signaling messages deviates from the reference message order.

10. The system of claim 8, wherein the server is configured to determine the reference message order by:

obtaining, by the server transceiver, the plurality of groups of reference protocol signaling messages prior to receiving the protocol signaling message and the one or more additional protocol signaling messages;

assigning, by the server processor using the one or more artificial intelligence models, the plurality of unique message tokens correspondingly to a plurality of reference protocol signaling messages in each group of reference protocol signaling messages of the plurality of groups of reference protocol signaling messages;

determining, by the server processor using the one or more artificial intelligence models, a training message order of the plurality of unique message tokens in each group of reference protocol signaling messages of the plurality of groups of reference protocol signaling messages; and identifying, by the server processor using the one or more artificial intelligence models, the plurality of unique message tokens with the training message order as the reference message order when a number of the plurality of unique message tokens with the training message order in the plurality of groups of reference protocol signaling messages exceeds a message threshold number.

11. The system of claim 10, wherein the server is further configured to:

determine, by the server processor, a frequency of occurrence of a reference protocol signaling message in the plurality of groups of reference protocol signaling messages;

assign, by the server processor, a first unique message token of the plurality of unique message tokens to the reference protocol signaling message when the frequency of occurrence of the reference protocol signaling message in the plurality of groups of reference protocol signaling messages is greater than a message token threshold frequency; and assign, by the server processor, a second unique message token of the plurality of unique message tokens to the reference protocol signaling message when the frequency of occurrence of the reference protocol signaling message in the plurality of groups of reference protocol signaling messages is lesser than the message token threshold frequency;

wherein a size of the first unique message token is smaller than a size of the second unique message token.

12. The system of claim 8, wherein a size of each unique message token of the plurality of unique message tokens is less than a size of a corresponding protocol signaling message or the one or more additional protocol signaling messages.

13. The system of claim 8, wherein the server is further configured to:

determine, by the server processor, time stamps associated with the protocol signaling message and the one or more additional protocol signaling messages exchanged between the at least two communication devices; and display, by the server processor, a notification on the user interface when a time difference between the time stamps is greater than a predefined time difference.

14. A method for optimizing processing of a protocol signaling message for identification of errors in the protocol signaling message, the method comprising:

receiving, by a server, the protocol signaling message exchanged between at least two communication devices over a communication network;

decoding, by the server, the protocol signaling message to obtain a decoded protocol signaling message, the decoded protocol signaling message having a plurality of bytes;

assigning, by the server, a plurality of unique tokens correspondingly to sets of bytes of the plurality of bytes;

determining, by the server, an order of the plurality of unique tokens in the decoded protocol signaling message;

tracking, by the server using one or more artificial intelligence models, one or more errors in the protocol signaling message based on a comparison of the order of the plurality of unique tokens with a reference order of a plurality of reference protocol signaling messages received by the server prior to receiving the protocol signaling message; and displaying, by the server, the one or more errors in the protocol signaling message on a user interface.

15. The method of claim 14, further including:

displaying, by the server, the order of the plurality of unique tokens in the decoded protocol signaling message on the user interface when the order of the plurality of unique tokens deviates from the reference order;

obtaining, by the server, a confirmation associated with a validity of the displayed order of the plurality of unique tokens via the user interface;

identifying, by the server, the displayed order of the plurality of unique tokens as an another reference order upon receiving the confirmation; and repeating, by the server using the one or more artificial intelligence models, the steps of displaying, obtaining, and identifying for each subsequent protocol signaling message when an order of a plurality of unique tokens in the corresponding subsequent protocol signaling message deviates from the reference order and the another reference order.

16. The method of claim 14, wherein the reference order is determined by:

obtaining, by the server, the plurality of reference protocol signaling messages prior to receiving the protocol signaling message;

decoding, by the server, the plurality of reference protocol signaling messages to obtain corresponding decoded reference protocol signaling messages;

dividing, by the server using the one or more artificial intelligence models, each decoded reference protocol signaling message of the plurality of decoded reference protocol signaling messages into the sets of bytes;

assigning, by the server using the one or more artificial intelligence models, the plurality of unique tokens correspondingly to the sets of bytes in each decoded reference protocol signaling message of the plurality of decoded reference protocol signaling messages;

determining, by the server using the one or more artificial intelligence models, a training order of the plurality of unique tokens in each decoded reference protocol signaling message of the plurality of decoded reference protocol signaling messages; and identifying, by the server using the one or more artificial intelligence models, the plurality of unique tokens with the training order as the reference order when a number of the plurality of unique tokens with the training order in the plurality of decoded reference protocol signaling messages exceeds a threshold number.

17. A method for optimizing processing of a group of protocol signaling messages for identification of message errors in the group of protocol signaling messages, the method comprising:

receiving, by a server, the group of protocol signaling messages including a protocol signaling message and one or more additional protocol signaling messages exchanged between at least two communication devices over a communication network, wherein the one or more additional protocol signaling messages are exchanged in sequence to the protocol signaling message;

assigning, by a server, a plurality of unique message tokens correspondingly to the protocol signaling message and the one or more additional protocol signaling messages;

determining, by the server, a message order of the plurality of unique message tokens;

tracking, by the server using one or more artificial intelligence models, one or more message errors in the protocol signaling message and the one or more additional protocol signaling messages based on a comparison of the message order of the plurality of unique message tokens with a reference message order of a plurality of groups of reference protocol signaling messages received by the server prior to receiving the protocol signaling message and the one or more additional protocol signaling messages; and displaying, by the server, the one or more message errors on a user interface.

18. The method of claim 17, further including:

displaying, by the server, the message order of the plurality of unique message tokens on the user interface when the message order of the plurality of unique message tokens deviates from the reference message order;

obtaining, by the server, a confirmation associated with a validity of the displayed message order of the plurality of unique message tokens via the user interface;

identifying, by the server, the displayed message order of the plurality of unique message tokens as another reference message order upon receiving the confirmation; and repeating, by the server using the one or more artificial intelligence models, the steps of displaying, obtaining, and identifying for another group of two or more protocol signaling messages when a message order of the plurality of unique message tokens in the corresponding another group of the two or more protocol signaling messages deviates from the reference message order.

19. The method of claim 17, wherein the reference message order is determined by:

obtaining, by the server, the plurality of groups of reference protocol signaling messages prior to receiving the protocol signaling message and the one or more additional protocol signaling messages;

assigning, by the server using the one or more artificial intelligence models, the plurality of unique message tokens correspondingly to a plurality of reference protocol signaling messages in each group of reference protocol signaling messages of the plurality of groups of reference protocol signaling messages;

determining, by the server using the one or more artificial intelligence models, a training message order of the plurality of unique message tokens in each group of reference protocol signaling messages of the plurality of groups of reference protocol signaling messages; and identifying, by the server using the one or more artificial intelligence models, the plurality of unique message tokens with the training message order as the reference message order when a number of the plurality of unique message tokens with the training message order in the plurality of groups of reference protocol signaling messages exceeds a message threshold number.

20. The method of claim 17, further including:

determining, by the server, time stamps associated with the protocol signaling message and the one or more additional protocol signaling messages exchanged between the at least two communication devices; and displaying, by the server, a notification on the user interface when a time difference between the time stamps is greater than a predefined time difference.

\* \* \* \* \*